United States Patent
Demura et al.

(10) Patent No.: US 6,923,169 B2
(45) Date of Patent: Aug. 2, 2005

(54) EXHAUST GAS PURIFYING APPARATUS OF INTERNAL COMBUSTION ENGINE AND ACTIVATION CONTROL METHOD FOR THE SAME

(75) Inventors: Takayuki Demura, Mishima (JP); Hiroyasu Koyama, Mishima (JP); Kaoru Ohtsuka, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/943,123

(22) Filed: Sep. 17, 2004

(65) Prior Publication Data

US 2005/0066650 A1 Mar. 31, 2005

(30) Foreign Application Priority Data

Sep. 26, 2003 (JP) ........................................ 2003-335692

(51) Int. Cl.[7] .............................................. F02D 41/00
(52) U.S. Cl. ........................................ 123/674; 123/704
(58) Field of Search ................................ 123/674, 704; 60/276, 284, 286

(56) References Cited

U.S. PATENT DOCUMENTS

| | | | | |
|---|---|---|---|---|
| 5,271,223 A | * | 12/1993 | Hoshi ........................... | 60/276 |
| 5,388,401 A | * | 2/1995 | Nishizawa et al. ........... | 60/274 |
| 5,456,063 A | * | 10/1995 | Yoshizaki et al. ............ | 60/284 |
| 6,832,474 B2 | * | 12/2004 | Hirooka et al. ............... | 60/289 |

FOREIGN PATENT DOCUMENTS

| JP | A 4-231649 | 8/1992 |
|---|---|---|
| JP | A 9-103647 | 4/1997 |
| JP | A 2000-352345 | 12/2000 |

* cited by examiner

Primary Examiner—Mahmoud Gimie
(74) Attorney, Agent, or Firm—Oliff & Berridge, PLC

(57) ABSTRACT

An exhaust gas purifying apparatus adopted to an internal combustion engine provided with air-fuel ratio learning means for learning a primary air-fuel ratio given in the form of a mass ratio between air and fuel introduced into a combustion chamber, comprises an exhaust gas purifying catalyst provided in an exhaust gas passage of the engine and a catalyst activating means for supplying secondary air to an upstream of the exhaust gas purifying catalyst and increasing the quantity of fuel supplied to the engine to activate the exhaust gas purifying catalyst. The apparatus further comprises air-fuel ratio learning determining means for, when the internal combustion engine is started, determining whether or not learning of the primary air-fuel ratio by the air-fuel ratio learning means is completed; and activation control means for, when determined that the learning of the primary air-fuel ratio is not completed, prohibiting supply of the secondary air and increase of the quantity of fuel by the catalyst activation means.

10 Claims, 5 Drawing Sheets

EXHAUST GAS PURIFYING APPARATUS OF INTERNAL COMBUSTION ENGINE AND ACTIVATION CONTROL METHOD FOR THE SAME

BACKGROUND OF THE INVENTION

1. Field of the Invention

The present invention relates to an exhaust gas purifying apparatus of an internal combustion engine which activates an exhaust gas purifying catalyst by increasing the quantity of fuel supplied to the internal combustion engine and supplying secondary air to an exhaust gas passage when the internal combustion engine is started.

2. Description of Related Art

As the exhaust gas purifying apparatus of the internal combustion engine, there has been well known an apparatus which at the time of a cold starting, increases the quantity of fuel supplied to the internal combustion engine and introduces the second air into an exhaust gas passage in order to activate an exhaust gas purifying catalyst rapidly and if catalyst temperature exceeds a predetermined temperature, stops introduction of the secondary air and increase of fuel accompanying the introduction (see Japanese Patent Application Laid-Open (JP-A) No. 9-103647). In addition to this, there exist JP-A Nos. 4-231649 and 2000-352345 as preceding technology documents of the present invention.

To activate catalyst by introducing the secondary air, it is necessary to control the secondary air-fuel ratio, which is given as a mass ratio between air and fuel near the catalyst into the range appropriate for warm-up of the catalyst (for example, near 16). If the secondary air-fuel ratio deflects to the lean side with respect to the appropriate range, the warm-up of the catalyst delay due to cooling effect of the catalyst due to the secondary air and reduction of oxidation thereby worsening emission of exhaust gas while if it deflects to the rich side, there is a fear that thermal deterioration or melting loss due to overheat of the catalyst may be induced because of intensification in oxidation.

Because the second air-fuel ratio near the catalyst is correlated to primary air-fuel ratio given as a mass ratio between intake air and fuel in a combustion chamber, the primary air-fuel ratio needs to be evident as a premise for controlling the secondary air-fuel ratio. However, in an actual internal combustion engine, because the primary air-fuel ratio deflects due to an error in the quantity of intake air, a deviation of the fuel amount from a control instruction value to the fuel injection valve and the like, the primary air-fuel ratio is learnt by using an air-fuel ratio sensor or the like and the primary air-fuel ratio is so controlled to coincide with a control target value based on that learning result. Even at the time of starting the internal combustion engine, new leaning is sometimes executed because previous learning results cannot be used due to battery clear or initialization of the learning results accompanying errors in the SRAM which stores the learning results. In this case, the primary air-fuel ratio cannot be grasped accurately until the learning is completed, and as a result, the secondary air-fuel ratio deflects from its appropriate range, so that the above-described problem may occur. Further, even if there is a learning result usable when the internal combustion engine starts, that learning result may be not reliable due to a fault in the air-fuel ratio sensor or the like and in such a case, the above-described problem may occur regarding the secondary air-fuel ratio.

SUMMARY OF THE INVENTION

An object of the present invention is to provide an exhaust gas purifying apparatus of an internal combustion engine capable of preventing worsening of warm-up condition or overheating of exhaust gas purifying catalyst due to an influence of learning about the primary air-fuel ratio and to provide an activation control method for the same.

To achieve the above-described object, according to a first aspect of the present invention, there is provided an exhaust gas purifying apparatus adopted to an internal combustion engine provided with air-fuel ratio learning means for learning a primary air-fuel ratio given in the form of a mass ratio between air and fuel introduced into a combustion chamber, comprising an exhaust gas purifying catalyst provided in an exhaust gas passage of the internal combustion engine and catalyst activating means for supplying secondary air to an upstream of the exhaust gas purifying catalyst and increasing the quantity of fuel supplied to the internal combustion engine to activate the exhaust gas purifying catalyst, the exhaust gas purifying apparatus further comprising: air-fuel ratio learning determining means for, when the internal combustion engine is started, determining whether or not learning of the primary air-fuel ratio by the air-fuel ratio learning means is completed; and activation control means for, when determined that the learning of the primary air-fuel ratio is not completed, prohibiting supply of the secondary air and increase of the quantity of fuel by the catalyst activation means.

According to the present invention, since the introduction of the secondary air and the increase of the quantity of fuel accompanying the introduction are prohibited unless the learning of the primary air-fuel ratio is completed when the internal combustion engine is started, the secondary air-fuel ratio is prevented from departing from an appropriate range due to the introduction of the secondary air when the primary air-fuel ratio is not evident. Further, cooling of exhaust gas purifying catalyst by the secondary air or overheating of the exhaust gas purifying catalyst by excessive fuel can be prevented. In the meantime, one condition in which a previous learning result is available at the time of startup is included in an example of cases where the learning is completed.

In the exhaust gas purifying apparatus of the first aspect of the present invention, the air-fuel ratio learning means may learn the primary air-fuel ratio in each of plural different learning regions corresponding to operating conditions of the internal combustion engine and the air-fuel ratio learning determining means may determine that the learning is completed, when at least the learning of the primary air-fuel ratio is completed in a learning region corresponding to an operating condition in which the supply of the secondary air and increase of the quantity of fuel are required to be executed. If the operating condition of the internal combustion engine, in which the supply of the secondary air and the increase of the quantity of fuel are actually required, is obtained preliminarily, and if the learning of the primary air-fuel ratio is completed in a learning region corresponding to that operating condition, activation processing of the catalyst by introducing the secondary air is not affected even if the primary air-fuel ratio is not learned with respect to other operating conditions. Accordingly, by determining whether or not necessary minimum learning is completed, it is possible to eliminate a fear that the catalyst activation processing may be prohibited more than necessary, thereby enabling the exhaust gas purifying catalyst to be activated rapidly.

In the above embodiment, the learning regions may be separated from each other by contour lines of intake air quantity in an area defined by rotation number of the internal combustion engine and load thereof. The exhaust gas purifying may further comprise abnormality determining means for determining whether or not there is any error in a sensor used for learning of the primary air-fuel ratio, wherein the activation control means prohibits the supply of the secondary air and increase of the quantity of fuel by the catalyst activating means when the abnormality determining means determines an abnormality in the sensor.

According to a second aspect of the present invention, there is provided an exhaust gas purifying apparatus adopted to an internal combustion engine provided with air-fuel ratio learning means for learning a primary air-fuel ratio given in the form of a mass ratio between air and fuel introduced into a combustion chamber, comprising an exhaust gas purifying catalyst provided in an exhaust gas passage of the internal combustion engine and catalyst activating means for supplying secondary air to an upstream of the exhaust gas purifying catalyst and increasing the quantity of fuel supplied to the internal combustion engine activating the exhaust gas purifying catalyst, the exhaust gas purifying apparatus further comprising: abnormality determining means for determining whether or not there is any error in a sensor used for learning of the primary air-fuel ratio given in the form of a ratio between the quantity of intake air and the quantity of the fuel introduced to the internal combustion engine; and activation control means for, when the abnormality determining means determines an abnormality in the sensor, prohibiting the supply of the secondary air and increase of the quantity of fuel by the catalyst activating means.

Because in the exhaust gas purifying apparatus of the second aspect, the catalyst activation processing is prohibited if a sensor used for learning of the primary air-fuel ratio is abnormal, there is no fear that the secondary air-fuel ratio may be controlled on the premise of an erroneous primary air-fuel ratio and like the exhaust gas purifying apparatus of the first aspect, cooling of the exhaust gas purifying catalyst with the secondary air or overheating of the exhaust gas purifying catalyst with excessive fuel can be prevented.

According to a third aspect of the present invention, there is provided an activation control method for an exhaust gas purifying apparatus, which is adopted to an internal combustion engine capable of learning a primary air-fuel ratio given in the form of a mass ratio between air and fuel introduced into a combustion chamber, said exhaust gas purifying apparatus comprising an exhaust gas purifying catalyst provided in an exhaust gas passage of the internal combustion engine and a catalyst activating means for supplying secondary air to an upstream of the exhaust gas purifying catalyst and increasing the quantity of fuel supplied to the internal combustion engine to activate the exhaust gas purifying catalyst, the activation control method comprising the steps of: determining whether or not learning of the primary air-fuel ratio is completed when the internal combustion engine is started; and prohibiting supply of the secondary air and increase of the quantity of fuel by the catalyst activation means when determined that the learning of the primary air-fuel ratio is not completed.

In the activation control method of the third aspect of the present invention, the primary air-fuel ratio may be learnt in each of plural different learning regions corresponding to the operating conditions of the internal combustion engine, and in the step of determining whether or not learning of the primary air-fuel ratio is completed, it may be determined that the learning is completed, when at least the learning of the primary air-fuel ratio is completed in a learning region corresponding to an operating condition in which the supply of the secondary air and increase of the quantity of fuel are required to be executed.

In the above embodiment, the learning regions may be separated from each other by contour lines of intake air quantity in an area defined by rotation number of the internal combustion engine and load thereof. The activation control method may further comprise the step of determining whether or not there is any error in a sensor used for learning of the primary air-fuel ratio, and the supply of the secondary air and increase of the quantity of fuel may be prohibited when determined an abnormality in the sensor.

According to the fourth aspect of the present invention, there is provided an activation control method for an exhaust gas purifying apparatus, which is adopted to an internal combustion engine capable of learning a primary air-fuel ratio given in the form of a mass ratio between air and fuel introduced into a combustion chamber, said exhaust gas purifying apparatus comprising an exhaust gas purifying catalyst provided in an exhaust gas passage of the internal combustion engine and a catalyst activating means for supplying secondary air to an upstream of the exhaust gas purifying catalyst and increasing the quantity of fuel supplied to the internal combustion engine to activate the exhaust gas purifying catalyst, the activation control method comprising the steps of: determining whether or not there is any error in a sensor used for learning of the primary air-fuel ratio given in the form of a ratio between the quantity of intake air and the quantity of the fuel introduced to the internal combustion engine; and prohibiting the supply of the secondary air and increase of the quantity of fuel by the catalyst activating means when determined an abnormality in the sensor.

DESCRIPTION OF THE PREFERRED EMBODIMENTS (First Embodiment)

Figure 1:
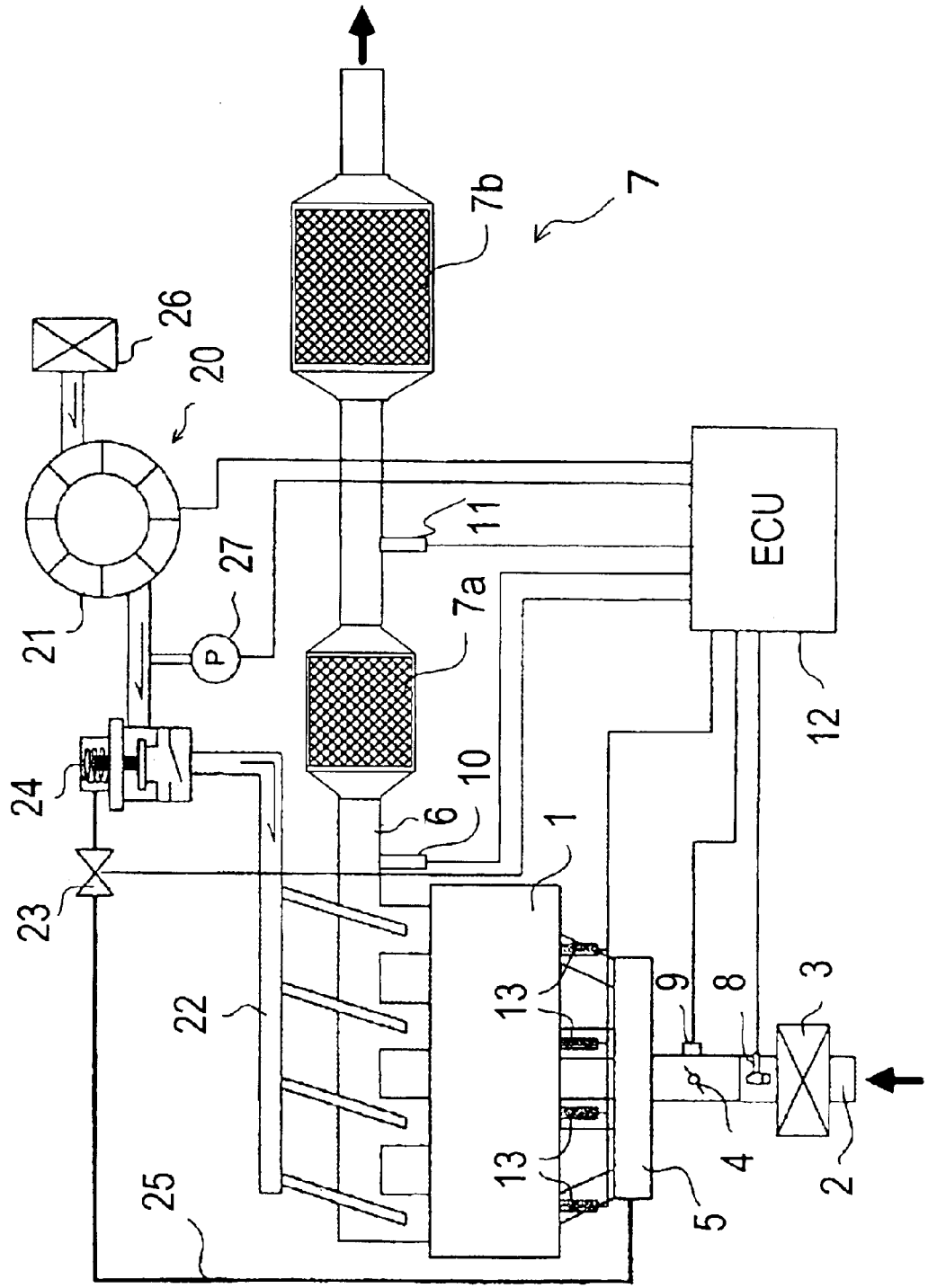
FIG. 1 is a diagram showing the exhaust gas purifying apparatus of the present invention and main portions of an internal combustion engine to which the same is applied.

FIG. 1 shows the exhaust gas purifying apparatus of the present invention and main portions of an internal combustion engine to which the same is applied. The internal combustion engine 1 is constructed in the form of, for example, an in-line four-cylinder gasoline engine. As well known, air (primary air) is sucked into an intake air passage 2 of the internal combustion engine 1 in a quantity depending on the opening degree of a throttle valve 4 through an air filter 3 and that air is introduced into each cylinder (not shown) through an intake manifold 5. Exhaust gas from the cylinder passes an exhaust gas passage 6 and is introduced to an exhaust gas purifying catalyst 7 and purified thereby and after that, discharged into the atmosphere through a silencer (not shown).

The exhaust gas purifying catalyst 7 comprises a start catalyst 7a and an $NO_x$ occlusion-reduction catalyst 7b provided in the downstream of the star catalyst 7a. The start catalyst 7a is provided in order to reduce the quantity of discharge of harmful substance until the $NO_x$ occlusion-reduction catalyst 7b is activated at the time of cold starting of the internal combustion engine 1. The start catalyst 7a is disposed as near an exhaust port of the internal combustion engine 1 as possible in order to achieve rapid activation and its heat capacity is set to be sufficiently smaller than that of the $NO_x$ occlusion-reduction catalyst 7b. As the start catalyst 7a, a well known three way catalyst which reduces $NO_x$ while oxidizing HC and CO is used. The well known $NO_x$ occlusion-reduction catalyst 7b absorbs and discharges the $NO_x$ with a predetermined absorbing material and reduces the discharged $NO_x$ with HC and CO in the exhaust gas while oxidizing the HC and CO.

In the intake air passage 2, an air flow meter 8 which outputs a signal corresponding to the quantity of intake air and a throttle opening degree sensor 9 which outputs a signal corresponding to the opening degree of a throttle valve 4 are provided. An air-fuel ratio sensor 10 (or $O_2$ sensor) for outputting a signal corresponding to the air-fuel ratio is provided in the upstream of the start catalyst 7a in the exhaust gas passage 6 and an $O_2$ sensor 11 (or an air-fuel ratio sensor) for outputting a signal corresponding to the quantity of oxygen in the exhaust gas is provided in the downstream of the start catalyst 7a and in the upstream of the $NO_x$ occlusion-reduction catalyst 7b. Output signals from the respective sensors 8–11 are introduced to the ECU 12. The ECU 12 is constructed in the form of a computer including a micro processor and peripheral circuits such as a ROM, a RAM necessary for the operation of the micro processor. The ECU 12 executes various kinds of arithmetic operations necessary for controlling the operating condition of the internal combustion engine 1 and operation controls on various kinds of devices, referring to the output signals of various kinds of sensors. For example, the ECU 12 controls the fuel injection amount of a fuel injection valve 13 so as to form a mixture air having a predetermined air-fuel ratio (primary air-fuel ratio) based on output signals from the air-fuel ratio sensor 10 and $O_2$ sensor 11. The air-fuel ratio control of the ECU 12 may be the same as that of an air-fuel ratio control unit of a well known internal combustion engine and the detail thereof is omitted. As sensors which the ECU 12 refers to, in addition to the above-described air flow meter 8, there are a water temperature sensor for outputting a signal corresponding to the cooling water temperature of the internal combustion engine 1, an intake air temperature sensor for outputting a signal corresponding to an intake air temperature, a crank angle sensor for outputting a signal corresponding to an angle of a crank shaft and the like. Graphic representation thereof is omitted.

The internal combustion engine 1 is provided with a secondary air supply unit 20. The secondary air supply unit 20 includes an electric air pump 21 as an air supply source, a secondary air passage 22 for connecting the air pump 21 to the exhaust gas passage 6, and a vacuum control valve 23 (VSV) and an air switching, valve 24 (ASV) for opening and closing the secondary air passage 22. The VSV 23 is an electromagnetic valve to be opened and closed according to an instruction from the ECU 12. When the VSV 23 is opened, negative pressure in the intake manifold 5 is introduced into the ASV 24 through a passage 25 and then, an internal passage of the ASV 24 is opened. If the ASV 24 is opened, the secondary air filtered by the air filter 26 is supplied to the exhaust gas passage 6 from the air pump 21 through the secondary air passage 22. In the meantime, the supply position of the secondary air to the exhaust gas passage 6 is just after the exhaust gas port of the internal combustion engine 1.

Figure 2:
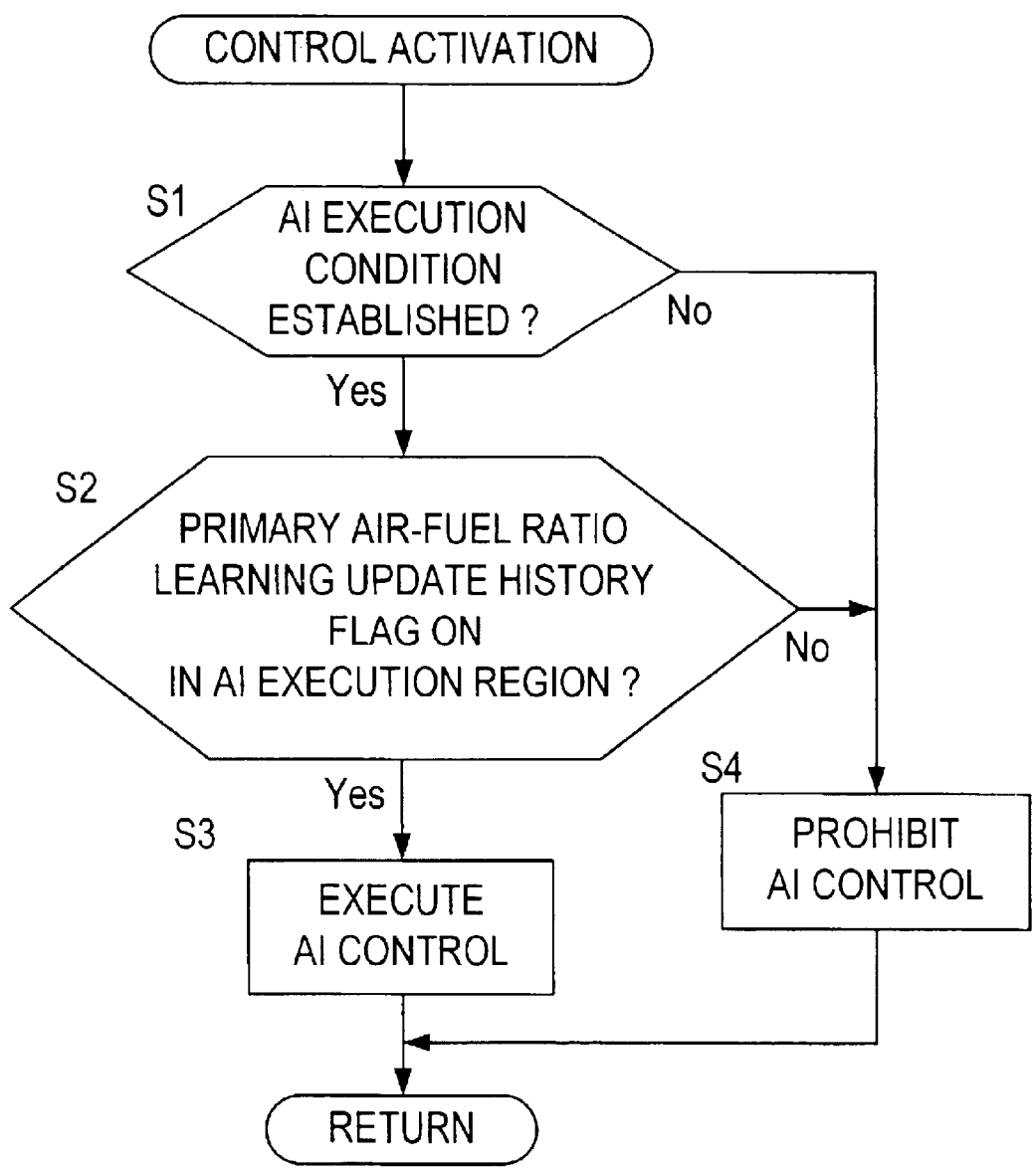
FIG. 2 is a flow chart showing an example of an activation control routine to be executed by the ECU of FIG. 1.

The secondary air supply unit 20 and fuel injection valve 13 are combined with the ECU 12 so as to form catalyst activating means of the present invention. FIG. 2 shows an activation control routine for making the ECU 12 function as the activation control means of the present invention. The ECU 12 executes the routine shown in FIG. 2 at a constant cycle during the operation of the internal combustion engine 1. In the following description, AI is an abbreviation of air injection meaning supply of the secondary air.

In the activation control routine of FIG. 2, the ECU 12 determines whether or not AI execution condition is established in step S1. The AI execution condition is a condition set for determining whether or not supply of the secondary air is permitted. For example, the AI execution condition is set up according to various parameters such as the time of passage after the internal combustion engine 1 is started, rotation number (rotation speed), cooling water temperature, battery voltage, quantity of intake air. Unless the AI execution condition is satisfied in step S1, the ECU 12 proceeds to step S4 to prohibit the AI control and then terminates the current routine.

Figure 3:
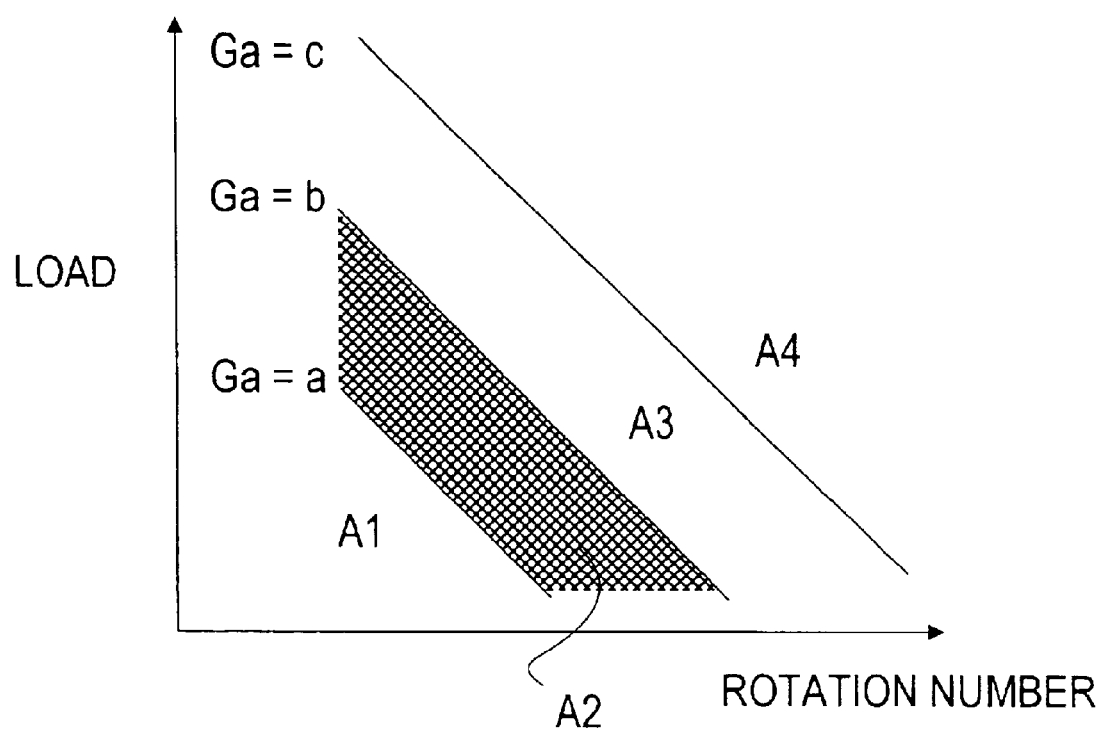
FIG. 3 is a diagram showing an example of a learning area corresponding to the rotation speed and load of the internal combustion engine.

On the other hand, if the AI execution condition is established, the ECU 12 proceeds to step S2 to determine whether or not a primary air-fuel ratio learning update history flag in a learning region for which the AI control should be executed is ON. The primary air-fuel ratio learning update history flag is turned ON when the primary air-fuel ratio learning is completed by the primary air-fuel ratio learning control routine described later, and this flag is set up for each of different learning regions corresponding to the operating conditions of the internal combustion engine 1. For example, in the relationship between the rotation number and load of the internal combustion engine 1 shown in FIG. 3, a flag is set up for each of regions A1 to A4 defined by contour lines (lines indicated with Ga=a, Ga=b, Ga=c in FIG. 3) of the intake air quantity Ga. Learning of temporary air-fuel ratio is executed in each of learning regions A1 to A4 and each time when the temporary air-fuel ratio learning is completed, the flag corresponding to a given learning region is turned ON. In step S2, the ECU 12 determines whether or not the flag corresponding to the region (region A2 in FIG. 3) within the regions A1 to A4, which is preliminary obtained as a region in which the AI control should be executed.

Returning to FIG. 2, if determined that the primary air-fuel ratio learning update history flag is not ON in step S2, the ECU 12 proceeds to step S4 to prohibit the AI control and then terminates the current routine. On the other hand, if determined that the learning update history flag is ON in step S2, the ECU 12 proceeds to step S3 to start the AI control and thereafter terminates the current routine. In the AI control, the VSV 23 is opened to introduce secondary air into the exhaust gas passage 6 and the quantity of fuel injection from the fuel injection valve 13 is increased to maintain the secondary air-fuel ratio in the start catalyst 7a at a value (for example, around 16) suitable for activation of the catalyst 7a. Because the quantity of secondary air supplied from the secondary air supply unit 20 is substantially constant, at the time of AI execution, the quantity of fuel injection from the fuel injection valve 13 is increased so that the primary air-fuel ratio given as the mass ratio between air and fuel taken into the combustion chamber of the internal combustion chamber 1 is maintained at a predetermined value (for example, about 12) during the execution of the AI. When the AI control is prohibited, the VSV 23 is closed to prevent the secondary air from being introduced to the exhaust gas passage 6 and the increase of quantity of fuel is not executed.

Next, a primary air-fuel ratio learning control routine for making the ECU 12 function as air-fuel ratio learning means will be described with reference to FIG. 4. The ECU 12 executes the routine of FIG. 4 at a constant cycle during the operation of the internal combustion engine 1.

Figure 4:
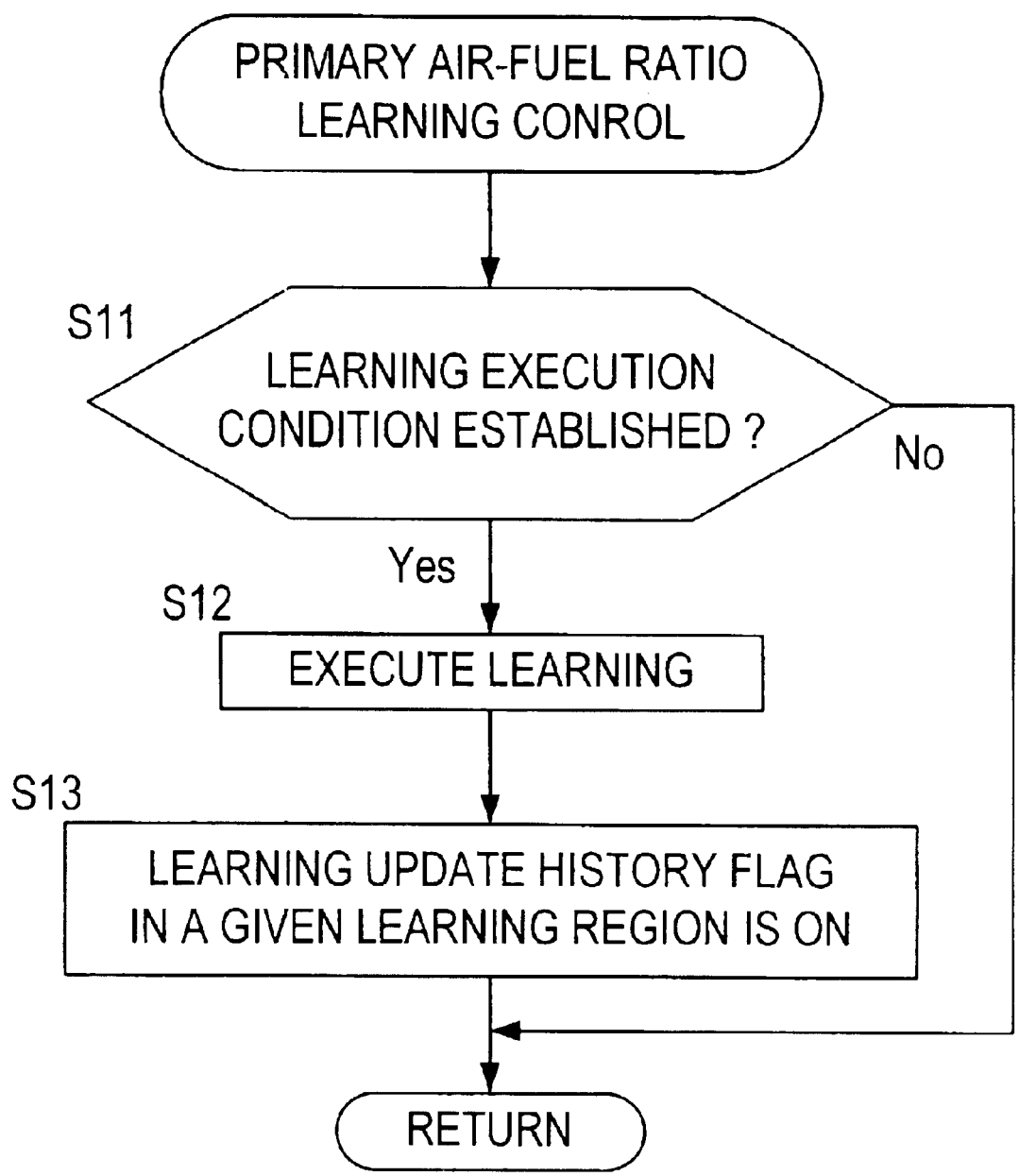
FIG. 4 is a flowchart showing another example of the primary air-fuel ratio learning control routine to be executed by the ECU of FIG. 1.

In the primary air-fuel ratio learning control routine of FIG. 4, the ECU 12 first determines whether or not the learning execution condition is established in step S11. The learning execution condition is a condition set for determining whether or not learning of the primary air-fuel ratio is permitted and this condition is set up based on various parameters such as cooling water temperature of the internal combustion chamber 1, an output of a rich signal indicating that the $O_2$ sensor 11 is activated and the like.

Unless the learning execution condition is satisfied in step S11, the ECU 12 terminates the current routine. On the other hand, if the learning execution condition is established, the ECU 12 proceeds to step S12 to execute the learning of the primary air-fuel ratio and then stores a learned value in a SRAM corresponding to a given learning region within SRAMs provided corresponding to the respective learning regions A1 to A4 of FIG. 3. This learning of the primary air-fuel ratio is carried out for correcting an error in the basic fuel injection amount originating from a difference of property of the internal combustion engine 1 or changes with a passage of time, by using an average value and the like of fuel injection amount feedback correction coefficient calculated based on output signals from the air-fuel ratio sensor 10 and the $O_2$ sensor 11. The specific procedure of this learning is the same as a well known learning control and is not described here.

Returning to FIG. 4, in step S13, the ECU 12 stores the primary air-fuel ratio learning update history flag of a given learning region in the SRAM with its ON condition and then terminates the current routine.

According to the above-described activation control routine, if the learning of the primary air-fuel ratio to be executed by the primary air-fuel ratio learning control routine is not completed, the AI control is prohibited so that introduction of the secondary air and the increase of the quantity of fuel accompanying the introduction are not executed. Consequently, the secondary air-fuel ratio can be prevented from departing from its appropriate range. As a result, cooling of the exhaust gas purifying catalyst 7 with the secondary air or overheating of the exhaust gas purifying catalyst 7 due to increase of excessive fuel can be prevented.
(Second Embodiment)

Figure 5:
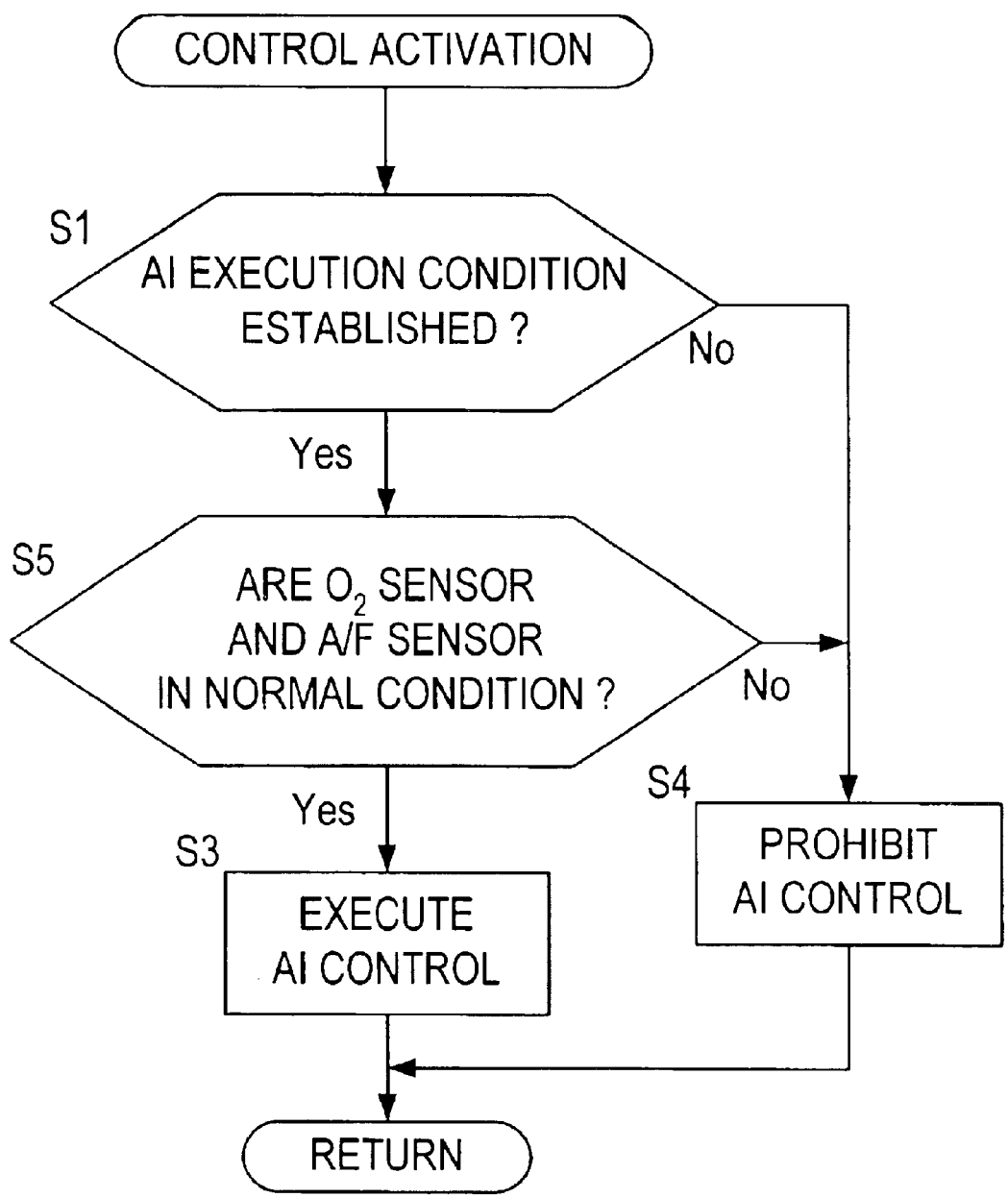
FIG. 5 is a flow chart showing another example of the activation control routine to be executed by the ECU of FIG. 1.

Next, the second embodiment of the present invention will be described with reference to FIG. 5. The second embodiment is different from the first embodiment in the condition for prohibiting the AI control. Thus, for the second embodiment, only a portion different from the first embodiment will be described and description of the same components is not repeated. In FIG. 5, like reference numerals are attached to the same components as in FIG. 2.

FIG. 5 shows a flow chart of the activation control routine to be executed by the ECU 12. In this routine, the ECU 12 determines whether or not the AI execution condition is established in step S1. Unless the AI execution condition is satisfied in step S1, the ECU 12 proceeds to step S4 to prohibit the AI control and then terminates the current routine. If the AI execution condition is established, the ECU 12 proceeds to step S5.

In subsequent step S5, the ECU 12 determines whether or not the sensors 10 and 11 are in normal condition with reference to a value of each diagnosis flag, which is set when determined that each of the air-fuel ratio sensor 10 and $O_2$ sensor 11 is in abnormal condition according to an abnormality diagnostic routine to be executed separately from FIG. 5. In the meantime, well known various kinds of procedures can be adopted for the abnormality diagnostic routine and the detail thereof is not repeated. If determined that the air-fuel ratio sensor 10 and the $O_2$ sensor 11 are in normal condition, the ECU 12 proceeds to step S5 to execute the AI control and then terminates the current routine. On the other hand, if determined that the air-fuel ratio sensor 10 or the $O_2$ sensor is not in normal condition, the ECU 12 proceeds to step S4 to prohibit the AI control and the then terminates the current routine.

When the activation control routine is executed, control of the secondary air-fuel ratio on the premise of an erroneous primary air-fuel ratio can be prevented because the AI control is prohibited when determined that the air-fuel ratio sensor 10 or the $O_2$ sensor 11 is not in normal condition. As a result, cooling of the exhaust gas purifying catalyst 7 with the secondary air and overheating of the exhaust gas purifying catalyst 7 due to increase of excessive fuel can be prevented.

According to the above-described embodiment, in the activation control routine of FIGS. 2, 5 and the primary air-fuel ratio learning control routine of FIG. 4, the ECU 12 functions as air-fuel ratio learning determining means by executing step S2, abnormality determining means by executing step S5 and air-fuel ratio learning means by executing step S12, respectively.

The present invention is not restricted to the above-described embodiments and may be carried out in various embodiments. For example, the exhaust gas purifying catalyst 7 is not limited to an embodiment including the start catalyst 7a and the $NO_x$ occlusion-reduction catalyst 7b. As long as worsening of the exhaust gas purifying catalyst and overheating thereof are prevented by the activation control means of the present invention, the quantity and the location of the exhaust gas purifying catalyst may be changed appropriately. The setting of the primary air-fuel ratio learning region is not limited to the regions A1 to A4 as long as it is set in correspondence with the operating condition of the internal combustion engine and it may be set up appropriately. Further, it is permissible to adopt the processings of FIG. 2 and FIG. 5 at the same time.

As described above, according to the present invention, by prohibiting the supply of the secondary air and increase of the quantity of fuel when the learning of the primary air-fuel ratio is not completed or there occurs an abnormality in a sensor used for learning of the primary air-fuel ratio, worsening of warm-up of the exhaust gas purifying catalyst or overheating thereof can be prevented.

What is claimed is:

1. An exhaust gas purifying apparatus adopted to an internal combustion engine provided with air-fuel ratio learning means for learning a primary air-fuel ratio given in the form of a mass ratio between air and fuel introduced into a combustion chamber, comprising an exhaust gas purifying catalyst provided in an exhaust gas passage of the internal combustion engine and a catalyst activating means for supplying secondary air to an upstream of the exhaust gas purifying catalyst and increasing the quantity of fuel supplied to the internal combustion engine to activate the exhaust gas purifying catalyst, the exhaust gas purifying apparatus further comprising:

air-fuel ratio learning determining means for, when the internal combustion engine is started, determining whether or not learning of the primary air-fuel ratio by the air-fuel ratio learning means is completed; and activation control means for, when determined that the learning of the primary air-fuel ratio is not completed, prohibiting supply of the secondary air and increase of the quantity of fuel by the catalyst activation means.

2. The exhaust gas purifying apparatus according to claim 1, wherein the air-fuel ratio learning means learns the primary air-fuel ratio in each of plural different learning regions corresponding to the operating conditions of the internal combustion engine and the air-fuel ratio learning determining means determines that the learning is completed, when at least the learning of the primary air-fuel ratio is completed in a learning region corresponding to an operating condition in which the supply of the secondary air and increase of the quantity of fuel are required to be executed.

3. The exhaust gas purifying apparatus according to claim 2, wherein the learning regions are separated from each other by contour lines of intake air quantity in an area defined by rotation number of the internal combustion engine and load thereof.

4. The exhaust gas purifying apparatus according to claim 1, further comprising abnormality determining means for determining whether or not there is any error in a sensor used for learning of the primary air-fuel ratio, wherein the activation control means prohibits the supply of the secondary air and increase of the quantity of fuel by the catalyst activating means when the abnormality determining means determines an abnormality in the sensor.

5. An exhaust gas purifying apparatus adopted to an internal combustion engine provided with air-fuel ratio learning means for learning a primary air-fuel ratio given in the form of a mass ratio between air and fuel introduced into a combustion chamber, comprising an exhaust gas purifying catalyst provided in an exhaust gas passage of the internal combustion engine and catalyst activating means for supplying secondary air to an upstream of the exhaust gas purifying catalyst and increasing the quantity of fuel supplied to the internal combustion engine to activate the exhaust gas purifying catalyst, the exhaust gas purifying apparatus further comprising:

abnormality determining means for determining whether or not there is any error in a sensor used for learning of the primary air-fuel ratio given in the form of a ratio between the quantity of intake air and the quantity of the fuel introduced to the internal combustion engine; and activation control means for, when the abnormality determining means determines an abnormality in the sensor, prohibiting the supply of the secondary air and increase of the quantity of fuel by the catalyst activating means.

6. An activation control method for an exhaust gas purifying apparatus, which is adopted to an internal combustion engine capable of learning a primary air-fuel ratio given in the form of a mass ratio between air and fuel introduced into a combustion chamber, said exhaust gas purifying apparatus comprising an exhaust gas purifying catalyst provided in an exhaust gas passage of the internal combustion engine and a catalyst activating means for supplying secondary air to an upstream of the exhaust gas purifying catalyst and increasing the quantity of fuel supplied to the internal combustion engine to activate the exhaust gas purifying catalyst, the activation control method comprising the steps of:

determining whether or not learning of the primary air-fuel ratio is completed when the internal combustion engine is started; and prohibiting supply of the secondary air and increase of the quantity of fuel by the catalyst activation means when determined that the learning of the primary air-fuel ratio is not completed.

7. The activation control method according to claim 6, wherein the primary air-fuel ratio is learnt in each of plural different learning regions corresponding to the operating conditions of the internal combustion engine, and in the step of determining whether or not learning of the primary air-fuel ratio is completed, it is determined that the learning is completed, when at least the learning of the primary air-fuel ratio is completed in a learning region corresponding to an operating condition in which the supply of the secondary air and increase of the quantity of fuel are required to be executed.

8. The activation control method according to claim 7, wherein the learning regions are separated from each other by contour lines of intake air quantity in an area defined by rotation number of the internal combustion engine and load thereof.

9. The activation control method according to claim 6, further comprising the step of determining whether or not there is any error in a sensor used for learning of the primary air-fuel ratio, wherein the supply of the secondary air and increase of the quantity of fuel are prohibited when determined an abnormality in the sensor.

10. An activation control method for an exhaust gas purifying apparatus, which is adopted to an internal combustion engine capable of learning a primary air-fuel ratio given in the form of a mass ratio between air and fuel introduced into a combustion chamber, said exhaust gas purifying apparatus comprising an exhaust gas purifying catalyst provided in an exhaust gas passage of the internal combustion engine and a catalyst activating means for supplying secondary air to an upstream of the exhaust gas purifying catalyst and increasing the quantity of fuel supplied to the internal combustion engine to activate the exhaust gas purifying catalyst, the activation control method comprising the steps of:

determining whether or not there is any error in a sensor used for learning of the primary air-fuel ratio given in the form of a ratio between the quantity of intake air and the quantity of the fuel introduced to the internal combustion engine; and prohibiting the supply of the secondary air and increase of the quantity of fuel by the catalyst activating means when determined an abnormality in the sensor.

* * * * *